Nov. 8, 1966  C. M. PERKINS  3,283,613
AUTOMOTIVE DEVICE
Filed April 20, 1964  3 Sheets-Sheet 1
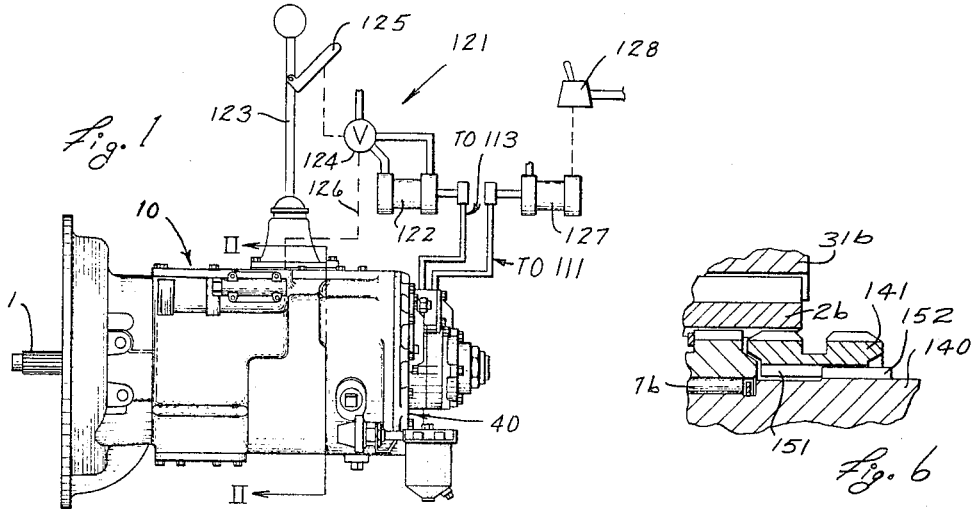
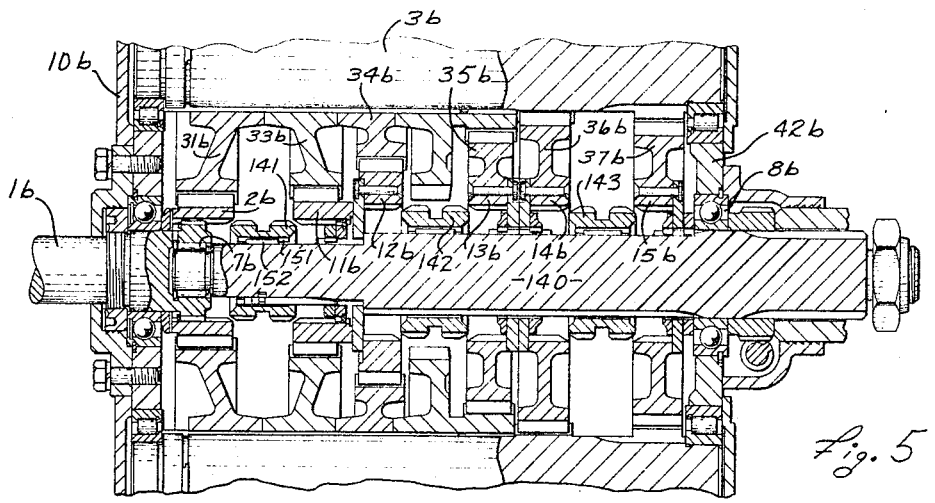
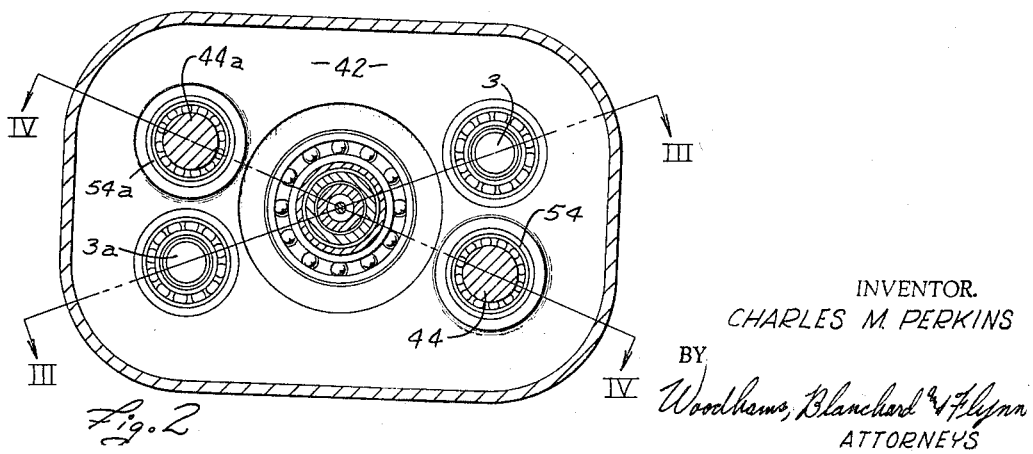
INVENTOR.
CHARLES M. PERKINS
BY
Woodhams, Blanchard & Flynn
ATTORNEYS

3,283,613
AUTOMOTIVE DEVICE

Charles M. Perkins, Oshtemo Township, Kalamazoo County, Mich., assignor to Eaton Yale & Towne Inc., a corporation of Ohio
Filed Apr. 20, 1964, Ser. No. 361,049
10 Claims. (Cl. 74—745)

This invention relates to shiftable change-speed gearing and it relates particularly to an arrangement comprising an auxiliary transmission unit, connected in series with a main transmission unit and having greater flexibility in use than presently known auxiliary units of this type.

The problems dealt with by the present invention arose in part out of the characteristics of those transmissions known as "range shift" transmissions and illustrated by United States Patent No. 2,637,221. In such a transmission there is provided a main or forward transmission unit having a plurality of relatively closed spaced ratios and serially connected therewith an auxiliary transmission unit having two widely spaced gear ratios. Usually, the ratios provided in the conventional two-speed auxiliary unit are direct drive and a low-speed ratio, the difference between said two ratios being approximately equal to or a little greater than the total range of the ratios available in the main unit.

In upshifting such a transmission, a first group of upshifts is made in the main unit while the auxiliary unit is in its low-speed ratio setting. The main unit is then put into neutral and the auxiliary unit is shifted from its low-speed ratio setting into its direct drive setting after which the main unit is shifted into its lowest speed ratio. The main box then is upshifted a second time through its several ratios while the auxiliary box continues in its direct drive position. Downshifting is the reverse of the upshift sequence above described.

It will be noted in the preceding description that the main transmission unit is in neutral position while the auxiliary unit is shifted. This occurs on both the upshift and the downshift sequence. As set forth at length in said patent, this frees the mainshaft of the main unit so that the synchronizers in the auxiliary unit can change the speed of the input end of said auxiliary unit appropriately to make the shift in the auxiliary unit possible and also to make possible the immediate subsequent shift of the main unit and to do so quickly enough to meet normal transmission requirements.

The foregoing-described apparatus has proved eminently satisfactory in practice. However, in a constant attempt to improve such apparatus it has been noted that for certain uses, both highway and off-highway (such as earth moving) uses, it is desirable to have an extra low range gear ratio provided and such can be accomplished by providing a third extra-low ratio in the auxiliary unit above described. However, in providing such further extra-low ratio, recognition must be made of the fact that, especially for off-highway use, such an extra-low ratio will normally be made use of only under conditions of very high load and very low speed. This greatly complicates the shifting of the transmission gears for reasons which are well recognized. This condition is aggravated where, as above described for the apparatus of Patent No. 2,637,221, the main unit must be put into neutral in order to effect the desired shift of the auxiliary unit. This requires, under conditions of high load and low speed, more time than can be tolerated and has therefore greatly restricted for such applications the use of positive gear types of transmissions in spite of the recognized better efficiency of such transmissions.

Moreover, hitherto it has been considered essential to use a three-speed auxiliary unit having the three speeds provided by three gears mounted on a single output shaft and selectively clutchable therewith. This has required the use of at least two clutches, each of which had to be positionable in a neutral position. A shifting control capable of shifting such an auxiliary unit, and also capable of performing the required shifting functions for the main unit, was extremely complex and hence expensive and difficult to maintain in the proper operating condition. Further, referring to an auxiliary unit of the "splitter" type, to provide a three-speed splitter type auxiliary unit also requires a very complex and expensive control system for the reasons just discussed.

In addition, three-speed auxiliary units, whether of the range shift type or the splitter type, have been relatively long and, therefore, could not be used in many installations because of the lack of sufficient space. This undue length is due at least in part to the fact that a large bearing and associated support structure had to be provided for the mainshaft of the auxiliary unit to enable it to withstand the radial loadings applied thereon.

United States Patent No. 3,105,395 and application Serial No. 296,956, now abandoned and replaced by a continuation-in-part application Serial No. 425,665, now Patent No. 3,237,472, disclose transmissions in which the gears on the mainshaft are each supported by gears on two symmetrically arranged countershafts so that the radial loadings on the mainshaft are minimal. By applying the principles of such a transmission to a three-speed auxiliary unit, the length of the three-speed auxiliary unit can be appreciably reduced without in any way diminishing its functional effectiveness. In particular, by elminating substantial radial loadings on the mainshaft of the auxiliary unit, the necessity for large and space-consuming bearings can be eliminated so that the length of the auxiliary unit can be shortened correspondingly.

Accordingly, the objects of the invention include:

(1) To provide an improved auxiliary change-speed gear unit which can be of either the range shifting or splitter type and which can be operated by a relatively simple control system.

(2) To provide an improved auxiliary change-speed gear unit, as aforesaid, which is of substantially less axial length than prior units intended for the same purposes.

(3) To provide a transmission system having a main unit and an auxiliary unit in which the auxiliary unit has at least three speeds and which is arranged so that a shift may be made in the auxiliary without the necessity of stopping any of the clutch parts in a neutral position during the shifting operation.

(4) To provide a transmission system, as aforesaid, having two ratios in the auxiliary unit of the same general character as set forth in Patent No. 2,637,221, and wherein an extra-low ratio is provided as an additional ratio in said auxiliary unit whereby the main transmission unit can proceed through its entire range of shift ratios while said auxiliary unit is in any one of its three ratios.

(5) To provide a transmission system, as aforesaid, which will require only a few additional parts as compared with the auxiliary transmission shown in Patent No. 2,637,221.

(6) To provide a transmission system, as aforesaid, which will be adaptable to a multicountershaft arrangement in the main transmission unit, particularly of the type shown in the patent of Charles M. Perkins, No. 3,105,395 and in the application of Charles M. Perkins and E. A. Richards, Serial No. 296,956, now abandoned and replaced by a continuation-in-part application Serial No. 425,665, now Patent No. 3,237,472, assigned to the same assignee as the present application.

(7) To provide a transmission system, as aforesaid, wherein a break is provided in the auxiliary unit in the power train between the normal low speed and extra-low speed gears whereby a shift can take place between said two last-named gear ratios but without the necessity of putting the main transmission unit into its neutral position and without the necessity of stopping the clutch parts in the auxiliary unit in neutral.

(8) To provide a transmission system, as aforesaid, which will be operable in the same general manner as the transmission disclosed in Patent No. 2,637,221 in order that an operator acquainted with the operation of the transmission of Patent No. 2,637,221 can easily and quickly learn to operate the transmission of the present invention.

(9) To provide an auxiliary unit, as aforesaid, which employs a plurality of countershafts so that radial loadings on the intermediate mainshaft means of the auxiliary unit can be reduced so that it will not be necessary to provide high-capacity bearings for supporting the intermediate mainshaft.

(10) To provide apparatus, as aforesaid, which can be provided at a minimum of additional cost over previously known equipment.

(11) To provide apparatus, as aforesaid, which will be sturdy and capable of meeting rigorous use requirements over a longer period of time without other than minor maintenance.

Other objects and purposes of the invention will become apparent to persons acquainted with apparatus of this general type upon reading the following disclosure and inspecting the accompanying drawings.

In the drawings:

FIGURE 1 is a schematic view of a transmission embodying the invention and the shifting controls therefor.

FIGURE 2 is a sectional view taken on the line II—II of FIGURE 1.

FIGURE 5 shows a modification.

FIGURE 6 shows a portion of FIGURE 5 on enlarged scale in another position.

In the following description, the term "rearward" and derivatives thereof shall refer to a direction toward the right in FIGURES 3 and 4, and the term "frontward" and derivatives thereof shall refer to a direction toward the left in said figures. The terms "inner and "outer" shall refer to directions toward and away from the longitudinal axis of the transmission.

*Brief description*

According to the invention, there is provided a transmission comprised of a main unit having a plurality of selectable ratios and an auxiliary unit having at least three selectable ratios. The auxiliary unit has an input shaft which is connected to or formed by the output shaft of the main unit. The input shaft drives countershaft means in the auxiliary unit which countershaft means has a plurality of gears mounted thereon. An output shaft of the auxiliary unit has an output gear thereon adapted to be driven by a countershaft gear, said output gear being selectably clutchable to said auxiliary output shaft. An intermediate shaft is positioned between the auxiliary input shaft and the auxiliary output shaft and is selectably clutchable to both thereof. The intermediate shaft has an intermediate gear thereon adapted to be driven by another countershaft gear, said intermediate gear being selectably clutchable to said intermediate shaft. Clutching means are provided for selectably and alternatively coupling (1) said auxiliary input shaft to said intermediate shaft and said intermediate shaft to said auxiliary output shaft, (2) said intermediate gear to said intermediate shaft and said intermediate shaft to said output shaft, and (3) said output gear to said auxiliary output shaft.

Preferably, the countershaft means is comprised of a plurality of countershafts having a plurality of sets of gears thereon, the gears of each set being identical. The intermediate gear and the output gear are each meshed wtih a set of the countershaft gears and are supported thereby. Thus, said intermediate shaft carries only torque loads, no appreciable, if any, radial load, and hence can be mounted on relatively light bearings which occupy only a small space. This contributes to minimizing the space requirements as compared to conventional three-speed auxiliaries.

*Detailed description*

Figure 3:
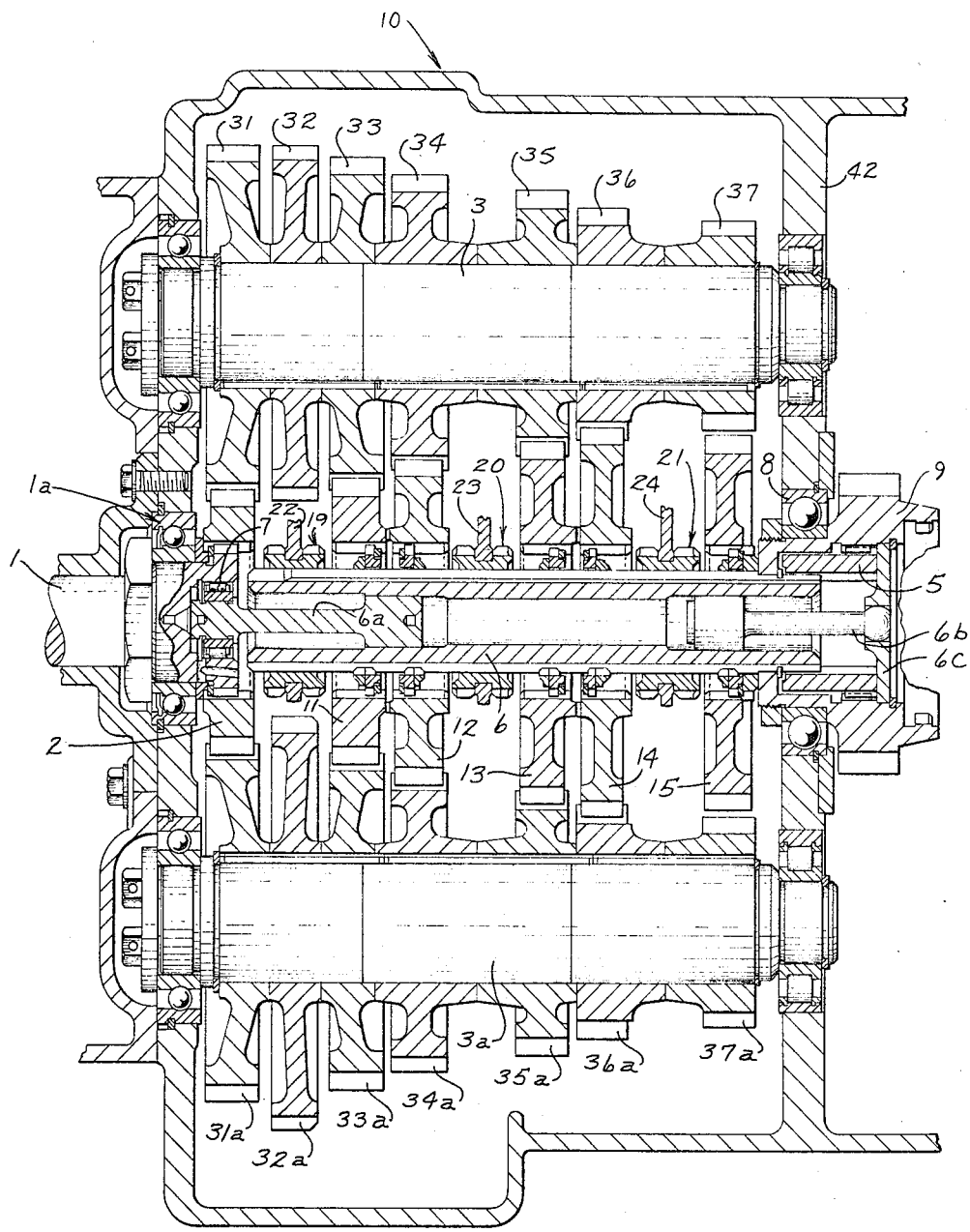
FIGURE 3 is a central sectional view taken along the line III—III of FIGURE 2 of a main change speed gear unit with which the auxiliary change gear unit embodying the invention may be used.
Figure 4:
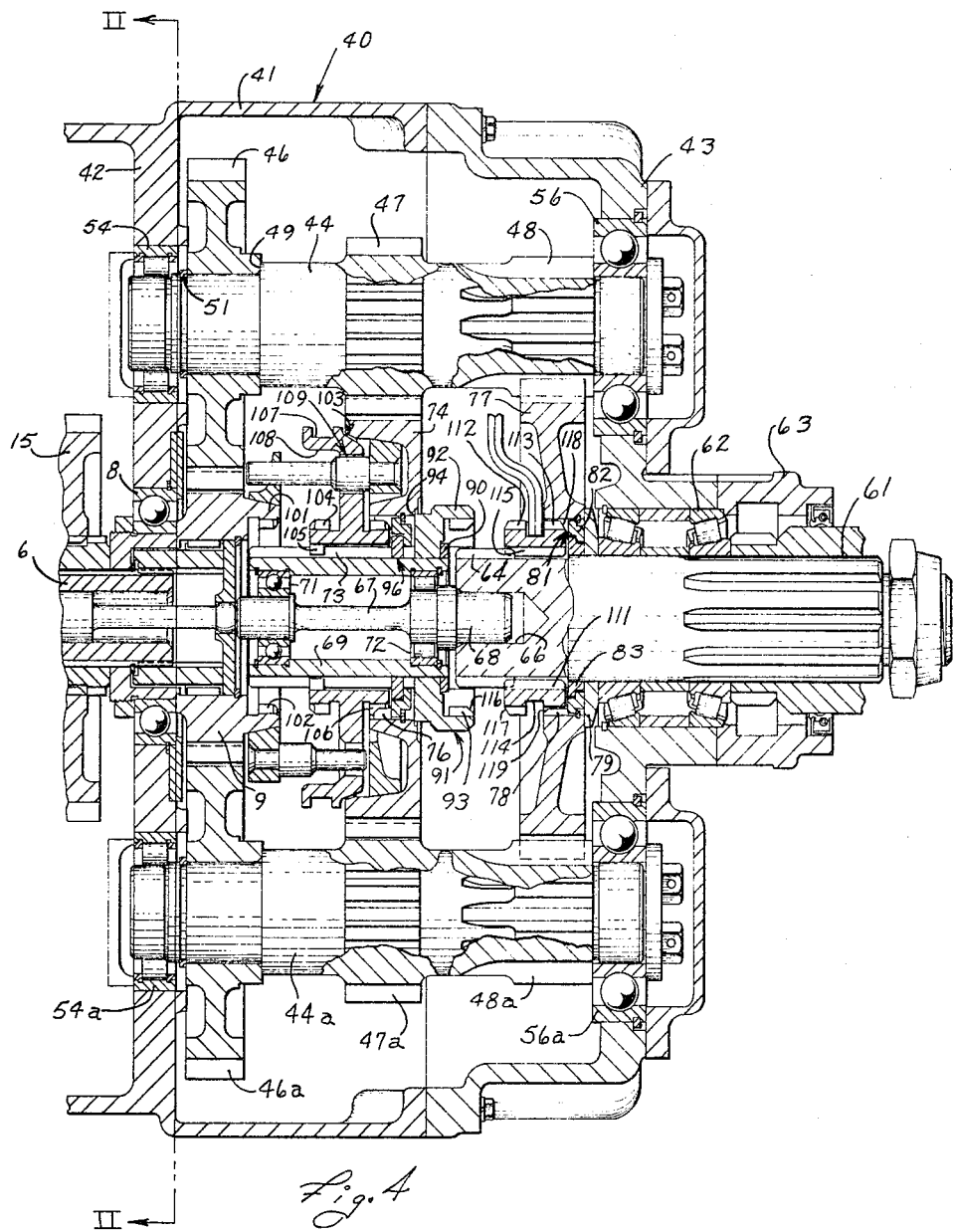
FIGURE 4 is a central sectional view taken along the line IV—IV of FIGURE 2 of the auxiliary change gear unit embodying the invention.

Referring now to the drawings, there is shown in FIGURE 3 a main transmission unit 10 which for illustrative purposes has here been shown as being of the multi-countershaft type, namely, the transmission illustrated and described in said application Serial No. 296,956, now abandoned and replaced by a continuation-in-part application Serial No. 425,665, now Patent No. 3,237,472. It will become apparent as the description proceeds that the auxiliary unit embodying the invention can be used with a wide variety of main units although it has special advantages when used with the main unit disclosed in FIGURE 3.

As more fully set forth in United States Patent No. 3,105,395 and application Serial No. 296,956, now abandoned and replaced by a continuation-in-part application Serial No. 425,665, now Patent No. 3,237,472, the main unit 10 has an input shaft 1, supported on bearing 1a, which shaft drives an input gear 2 which simultaneously drives countershafts 3 and 3a at identical speeds. An output element, here the auxiliary input gear 9, is rotatably supported in bearing 8. A mainshaft 6 is rotatably supported through the spring 6a (as set forth in detail in said application Serial No. 296,956, now abandoned and replaced by a continuation-in-part application Serial No. 425,665, now Patent No. 3,237,472) at its forward end in the bearing 7 located in the input shaft 1 and is supported at its other and nonrotatably with respect to and through the spring 6b and flange 6c on the gear 9. In this embodiment, the driving relationship between the shaft 6 and gear 9 is accomplished by connecting the externally splined rearward end of the mainshaft 6 into the internally splined forward end of the sleeve 5 and connecting the externally splined rearward end of said sleeve within the internally splined gear 9. Thus, relative radial movement between the shaft 6 and the gear 9 is permitted for the purpose of making possible the necessary floating of the shaft 6. This structure is generally similar to that shown for the transmission output connection in said application Serial No. 296,956.

A plurality of mainshaft drive gears 11–15 encircle the mainshaft 6 and are selectively clutchable thereto one at a time by any convenient means such as the sliding clutch mechanisms 19, 20 and 21 which are respectively operable by suitable shift forks 22, 23 and 24. The countershafts 3 and 3a are provided with pairs of countershaft gears, both gears of each pair being of identical size and number of teeth with respect to each other, which pairs are identical at 31, 31a–37, 37a. Gears 31, 31a are meshed with the input gear 2, gears 32, 32a are power take-off gears and gears 37, 37a are reverse gears.

Both gears of each pair of said countershaft gears 33, 32a–36 are simultaneously and continuously meshed with one of the mainshaft gears 11–14 and provide the sole support for said mainshaft gears. Thus, as a given one of said mainshaft gears is clutched to said mainshaft 6, the mainshaft will be driven through an appropriately selected ratio from said input shaft 1.

Further details of the construction and operation of this type of main transmission are set forth in the above-mentioned patents and applications and reference can be made thereto for a more complete description. It is to be understood, however, that the auxiliary unit embodying the invention, while designed particularly for use with the main transmission herein shown and having special advantages when used therewith, is nevertheless useful with other types of main transmissions, such as that shown in United Patent No. 2,637,221.

Turning now to the auxiliary change-speed gear unit 40 (FIGURE 4), the same is, in this embodiment, mounted within a casing 41 having a front wall 42 and a rear wall 43. In this embodiment the front wall 42 also functions as the rear wall of the main unit 10 but it will be recognized that this is a matter of convenience only and that the casing 41 may be completely independent of and separate from the casing of the main unit.

Said auxiliary unit 40 has a pair of countershafts 44 and 44a on which are provided for rotation therewith three pairs of gears 46 and 46a, 47 and 47a and 48 and 48a, both gears of each pair being of identical size and number of teeth with respect to each other. In this embodiment, the gear 46 is mounted on the countershaft 44 by suitable splining on said countershaft with the gear being held against a shoulder 49 on said countershaft by a snap ring 51. Gears 47 and 48 are formed integral with the shaft 44. The gears 46a, 47a and 48 are identical with the gears 46, 47 and 48, respectively, and are similarly associated with the shaft 44a. Said shafts 44 and 44a are rotatably supported in suitable bearings 54 and 56 and 54a and 56a, respectively, in the walls 42 and 43 of the casing 41. The bearings 54 and 54a are in this embodiment set in a plane (FIGURE 2) at an angle to the plane passing through the axes of the main transmission countershafts 3 and 3a. This, however, is only a matter of convenience and provides mounting space for the several bearings in the common wall 42 of both units. If the auxiliary unit is in a casing separate from that of the main unit, then the relative positions of the auxiliary countershafts 44 and 44a with respect to the main countershafts 3 and 3a become immaterial.

The auxiliary output shaft 61 is supported against both radial and axial movement by the radial-thrust bearing 62 which is of a conventional type and which is held within a sleeve 63 extending rearwardly (rightwardly in FIGURE 4) from the wall 43. The forward (leftwardly as appearing in FIGURE 4) end of said output shaft 61 is provided with the splines 64 and has an internal opening 66 extending through the forward (leftward) end thereof. A quill shaft 67 is mounted in any convenient manner coaxially between the main output shaft 6 and the auxiliary output shaft 61. In this embodiment the quill shaft 67 has an enlarged end 68 which is pressed into the opening 66 for holding said quill shaft firmly with respect to the output shaft 61. A sleeve, or intermediate, shaft 69 surrounds the quill shaft 67 and is supported thereon by bearings 71 and 72. Said sleeve shaft 69 is provided with external splining 73. The bearings 71 and 72, as well as the quill shaft itself, are relatively light but are sufficient inasmuch as the sleeve shaft 69 carries only torque loads and is fully supported radially as hereinafter described.

A low-range gear 74 is provided between the countershaft gears 47 and 47a, is in constant mesh with said countershaft gears and is supported by said countershaft gears. It surrounds the sleeve shaft 69 but is not supported thereby and, therefore, as set forth in the above-mentioned Patent No. 3,105,395, said gear 74 can move radially with respect to said sleeve shaft when there is no connection between same, such connection when made being in the manner described hereinafter. Said gear 74 is provided with internal jaw clutch teeth 76 for such connection as appearing hereinafter.

A creeper gear 77 is positioned between, is in constant mesh with and is supported by, the countershaft gears 48 and 48a. The creeper gear 77 surrounds the output shaft 61 but is not supported thereby and, therefore, as set forth in the above-mentioned Patent No. 3,105,395, said gear 77 can move radially with respect to said output shaft when there is no connection between same, such connection when made being in the manner described hereinafter. The creeper gear 77 is provided with internal jaw clutch teeth 78. Said gear 77 is held against axial movement in a rearward direction by a spacer ring 79 positioned between said gear and the forward end of the bearing 62 and is held against forward axial movement in this embodiment by any convenient means 81 which in this embodiment comprises a shouldered ring 82 mounted within the central opening of said gear 77 and which is adapted to abut against an oppositely shouldered ring 83 which is fixed to the shaft 61.

An intermediate drive unit 91 is in this embodiment for construction reasons made separate from the intermediate shaft 69. It is internally splined and is mounted on the splines 73 at the rearward end of the sleeve shaft 69 for rotation therewith and is held against rearward movement with respect to said sleeve shaft by a collar 90. The drive unit 91 has a flange portion 92 extending rearwardly which is provided with internal jaw clutch teeth 93 for purposes appearing hereinafter. The gear 74 is prevented from rearward axial movement by its bearing against an end wall 94 of the member 91 and is held against forward movement by the stop unit 96 which is generally similar to the stop unit 81.

The auxiliary input gear 9 has a rearwardly extending flange 101 thereon which is provided with internal jaw clutch teeth 102. A slider 103 has relatively short, forwardly placed, internal teeth 105 meshed with the splines 73 on the sleeve shaft 69 by which it will rotate with the sleeve shaft 69 but can move both axially and angularly with respect thereto. The slider 103 is provided with external, forwardly placed, jaw clutch teeth 104 engageable with the jaw clutch teeth 102 when said slider is in its forwardmost position and is further provided with external, rearwardly placed, jaw clutch teeth 106 which are engageable with the jaw clutch teeth 76 when said slider moves in its rearwardmost position. Since the slider 103 engages the gear 74 only at its rearward end and is itself in turn supported on the sleeve shaft 69 only at its forward end, an angular rocking movement is permitted between the axis of the slider 103 and the axis of the gear 74 which in turn permits a limited but sufficient radial movement of the gear 74 with respect to the shaft 69. Thus, even when said parts are engaged, said slider 103 will not restrict the desired radial movement of the gear 74 by which, as described in Patent No. 3,105,395, the driving torques from the countershafts 44 and 44a through said gear 74 are equalized.

Any suitable shift fork means is engageable with a groove 107 in the flange 108 on the slider 103 for effecting forward and rearward axial movement of said slider 103. Any convenient synchronizer means, here utilizing pins 109 and further described in Patent No. 3,221,851, is preferably provided for effecting synchronization in a conventional manner between the gear 9 and slider 103 and gear 74 and slider 103 as said slider moves forwardly or rearwardly, respectively.

An internally splined second slider 111 surrounds the shaft 61 and has internal teeth 115 in engagement with the axially shortened, forwardly placed, splines 64 thereon so that said slider 111 rotates with the shaft 61 but is axially movable with respect thereto. When the slider 111 is in its rearwardmost position (rightward as shown in FIGURE 4), the internal splines 115 and shaft splines 64 engage over only a short axial length so that slider 111, like slider 103, can move both axially and angularly with respect to the axis of shaft 61. Said slider 111 has external, forwardly placed, jaw clutch teeth 112 thereon arranged for engagement with the jaw clutch teeth 93 upon forward axial movement of said slider 111 and it has further external, rearwardly placed, jaw clutch teeth 113 arranged for engagement with the jaw clutch teeth 78 upon rearward axial movement of said slider. Thus, as in the case above described of the slider 103 and gear 74, when the slider 111 is in its rearwardmost position and in engagement with the gear 77, the capability of the slider 111 for angular movement with respect to the shaft 69 will permit the above-mentioned radial movement of the gear 77 and thereby permit equalizing of the driving torque from the countershafts 44 and 44a to the shaft 61. Said slider is also provided with a groove 114 for engagement by a conventional shift fork (only partially shown) for effecting forward and rearward movement thereof.

Thus, when the gear 74 is engaged through the slider 103, with the shaft 69 as shown, said gear will be rotatable with said shaft, axially fixed with respect thereto but still radially movable with respect thereto within the limits required for proper dividing of torque load on each countershaft as described in said Patent No. 3,105,395. Similarly, when gear 77 is engaged through the slider 111 with the shaft 61 as shown, said gear will be rotatable with said shaft, axially fixed with respect thereto but still radially movable with respect thereto within the limits required for proper dividing of torque load on each countershaft as described in said Patent No. 3,105,395. When either or both of the sliders 103 and 111 become disengaged from their respective gears, the gear or gears so disengaged will become rotatable with respect to the shafts but will remain axially fixed and radially movable with respect thereto. By this arrangement, the shafts 69 and 61 may be mounted for rotation about fixed axes instead of floatingly mounting same as in the case of Patent No. 3,105,395, while the gears 74 and 77 are still permitted to float on radially movable axes to equalize the torque transmitted through said gears from the respective countershafts in the same manner as described in detail for the corresponding gears in Patent No. 3,105,-395 and in application Serial No. 296,956, now abandoned and replaced by a continuation-in-part application Serial No. 425,665, now Patent No. 3,237,472. In the present construction, the function of the floating shaft in Patent No. 3,105,395 and application Serial No. 296,-956, now abandoned and replaced by a continuation-in-part application Serial No. 425,665, now Patent No. 3,237,472, is performed by the ends of the sliders, or sleeves, 103 and 111 which engage the gears 74 and 77, namely, the rearward (rightward as appearing in FIGURE 4) ends of said sleeves carrying the teeth 106 and 113, respectively. Thus, in a broad sense the rearward ends of the sleeves 103 and 111, being radially floatable, function with respect to the gears 74 and 77, respectively, as well as with respect to the rest of the apparatus in a manner generally similar to the function of the mainshaft in Patent No. 3,105,395 and application Serial No. 296,-956, now abandoned and replaced by a continuation-in-part application Serial No. 425,665, now Patent No. 3,237,472, and are themselves mounted for delivering torque to shafts on nonfloating axes in a manner generally similar to the manner by which the floating mainshaft in application Serial No. 296,956, now abandoned and replaced by a continuation-in-part application Serial No. 425,665, now Patent No. 3,237,472, delivers torque to an output unit mounted with a nonfloating axis. Thus, in a broad sense, the use of the sleeves 103 and 111 with the gears 74 and 77 is based on the same idea and theory of operation as that dealt with in said Patent No. 3,105,-395 and application Serial No. 296,956, now abandoned and replaced by a continuation-in-part application Serial No. 425,665, now Patent No. 3,237,472, even though the specific means for carrying out these functions are different.

As shown, the opposing end faces 116 and 117 of the jaw clutch teeth 93 and 112, slope at an angle of about 30 and 40 degrees with respect to the axis of rotation of shafts 61 and 67 for providing easy engagement of said clutch teeth as set forth more fully in application Serial No. 160,033, whereby with the relatively slow speed differentials involved with the shifting of the second slider 111, the use of synchronizers may, if desired, be avoided. The opposing end faces 118 and 119 of the teeth 78 and 113 are similarly shaped for the same reasons.

Any convenient power means indicated generally at 121 (FIGURE 1) is provided for operating the forward slider 103, preferably through an air cylinder 122. As set forth in detail in said Patent No. 2,637,221, the main transmission can be manually operated in a conventional manner by a shift lever 123. The valve 124 which controls operation of the air cylinder 122 is preselectable by the operator by actuation of the actuator 125, and also is responsive to the condition of the main unit as indicated by the control connection schematically shown at 126. When the main transmission comes into neutral position after preselection by actuation of actuator 125, the valve 124 is then shifted in order to shift the slider 103. It is to be noted that this shift control is the same as that used in Patent No. 2,931,237.

The rear slider 111 can be operated by hand through conventional manually actuatable means, if desired, but is preferably operated by a pressure cylinder 127 responsive to suitable control means, such as a manually controlled valve 128.

Operation

With the rear slider 111 in its forward position, so that its jaw clutch teeth 112 engage the jaw clutch teeth 93, the gear 77 will be disengaged from the shaft 61 and there is a direct connection from the sleeve shaft 69 through the clutch member 91 to the output shaft 61. In such condition the auxiliary unit will be capable of operating as a conventional range shift auxiliary in the manner set forth in detail in said Patent No. 2,637,221. Briefly, however, this operation will be described following.

With the slider 103 in its rearward position so that the gear 74 is drivingly connected to the sleeve shaft 69, a ratio connection will be made from the mainshaft 6 of the main transmission through the gear 9, thence through the gears 46 and 46a, the shafts 44 and 44a, the gears 47 and 47a to the gear 74 thence to the sleeve shaft 69 and to the output shaft 61. In this low-speed ratio of the auxiliary unit, the main unit can be operated manually through whatever number of ratios is provided therein. In this embodiment, such operation occurs by successively connecting the mainshaft drive gears 11 to 15 to the mainshaft 6, as explained fully in said Patent No. 3,105,395 and in said application Serial No. 296,956, now abandoned and replaced by a continuation-in-part application Serial No. 425,665, now Patent No. 3,237,472. When the highest desired speed is reached in the main unit, which will normally be direct drive therein, and it is desired to shift into a higher speed, the main unit is returned to neutral at which time the cylinder 122 is energized and the slider 103 moved forwardly so that its jaw clutch teeth 104 engage the jaw clutch teeth 102 and thereby provide a direct connection from the mainshaft 6 through the gear 9 to the sleeve shaft 69, thence to the auxiliary output shaft 61. Inasmuch as the mainshaft 6 is the only part whose speed must be changed by the synchronizing mechanism 109 in order to effect engagement of the jaw clutch teeth 104 with the jaw clutch teeth 102, and since said mainshaft 6 has relatively little inertia, such engagement may be made quickly, easily and reliably. After same is completed, and said mainshaft 6 has slowed appropriately, a shift into low speed in the main transmission may now be accomplished by appropriate actuation of the clutch 21. The main transmission is now again shifted manually through its several speed ratios until it is again in direct drive whereby the whole transmission is in direct drive. Downshifting is accomplished by a reversal of the above-outlined steps.

All of the foregoing-described operation is already well known and is fully set forth in said Patent No. 2,637,221 and is outlined here briefly only for purposes of convenient reference.

Turning now to the operation of the creeper gear 77 it may be assumed that the vehicle is at a standstill and it is to be started, or at least operated, very slowly and under heavy load.

Under these circumstances, the output shaft 61 will be stationary due to its connection with the ground wheels of the vehicle, the sleeve shaft 69 and the shaft 6 may for the moment be assumed to be stationary by reason of the several clutch mechanisms 19, 20 and 21 being disconnected and the input gear 2 may be assumed to be rotating.

With the main clutch (not shown) between the engine and the input shaft 1 opened, the main transmission will be moved into its low-speed ratio by movement of clutch mechanism 21. The main clutch may, if necessary, be momentarily engaged to assist the meshing of the jaw clutch teeth in the main unit.

The sliders 103 and 111 will now be moved rearwardly if they, or either of them, is not already in the rearward position, with momentary engagement of the main clutch, if necessary, to assist engagement of the clutch teeth concerned. The transmission is now ready for operation and the vehicle may be started when the operator is ready by engagement of the main clutch.

In view of the nondriving relationship between the member 91 and the slider 111, the gear 74 will have no effect upon the driving of the shaft 61 but it will be ready to assume its function upon forward movement of said slider 111. Thus, with the slider 111 engaged in its rearward position as above mentioned and illustrated, the main unit can be shifted through as much as desired of its range. When it is desired to continue the upshift progression by disconnecting the gear 77 and utilizing the gear 74, the rearward slider 111 is then merely moved forwardly to drivingly engage the member 91 and this may be done without the necessity of first moving the slider 103 into its neutral position. If desired, however, to avoid too large a change in ratios, the front or main transmission may be shifted downwardly one or two steps at the same time said shift of the rearward slider 111 occurs and the upshift progression may then be continued in the manner above described through first the gear 74 of the auxiliary transmission and ultimately through the direct drive ratio thereof.

It is recognized that when the main unit and the slider 111 are to be shifted simultaneously, it will require the use of both hands of the operator where the slider 111 is shifted manually but at the extremely slow speeds involved here, this will be acceptable. Usually, however, both of the sliders 103 and 111 will be power shifted in any convenient manner as indicated above.

Downshifting can be carried out by reversing the steps above outlined for upshifting.

While the foregoing description has referred to an operation in which the output shaft 61 is driven first from the gear 77, then from the gear 74 and then in direct drive, it will be recognized that because the speed ratios provided by gears 74 and 77 are relatively closely spaced, there may be occasions in which both gears may be used alternatingly in a shifting sequence to meet particular conditions. Hence, as regards the low ratio provided by gear 74 and the extra low ratio provided by gear 77, there is no mandatory shifting sequence and the operator will be free to choose whatever ratio he may think is appropriate in a given situation.

The foregoing description has referred to a range shifting auxiliary unit and such is a preferred embodiment of the invention. However, the auxiliary unit and main unit can be designed for splitter operation. If such is the case the gear ratios in the main unit are more widely spaced than for range shifting purposes and the auxiliary unit ratios are more closely spaced so that they provide steps intermediate the steps in the main unit. This requires essentially only a change in the size and number of teeth of the gears of the main and auxiliary units. In operation, then, the auxiliary unit could be shifted between its three ratios before the main unit is shifted from one ratio to another.

It is to be noted that it is not necessary to position the slider 103 nor the slider 111 in a neutral position out of engagement with the clutches at either of their respective ends. Instead, the sliders 103 and 111 are preferably, and in this embodiment are, power actuated to either of only two positions, namely, their full forward positions or their full rearward positions. Hence, the controls and actuators need to provide only for such two positions of each slider and can be relatively simple. Hence, the control system required to position the slider 103 can be quite simple and advantageously can be the same as that disclosed for shifting the auxiliary unit in Patent No. 2,637,221.

It is further to be noted that it is not necessary to provide heavy bearings for supporting the sleeve shaft 69. Because the sleeve shaft 69 is not subjected to major radial loads, and because the drive thereof is through the diametrically opposed gears 47 and 47a in one instance and through the coaxial gear 9 in the other instance, the pilot 68 will provide adequate support. This makes it possible to substantially reduce the axial length of the auxiliary unit.

While the use of the sleeves 103 and 111 has been thus far described in association with the two separate shaft units 69 and 61, respectively, it will be understood that since said shaft units are not radially movable with respect to each other and since in some conditions of operation of the apparatus shown such shaft units are clutched together to function as a single shaft, this constitutes also a disclosure of the use of a plurality of sleeves similar to sleeves 103 and 111 along the length of a single shaft but with said shaft mounted on conventional fixed bearings instead of the floating mounting shown in FIGURE 3 or in U.S. Patent No. 3,105,395. This possibility is shown in FIGURE 5 where parts identified by the numerals with the letter "b" associated therewith are the same as the correspondingly numbered parts of the main transmission of FIGURE 3. The shaft 140 is, however, mounted in fixed bearings 7b and 8b and the sleeves 141–143, respectively, connect the gears 2b and 11b–15b to the shaft 140. Said sleeves are provided with internal splines 151 which cooperate with axially short splines 152 for permitting axially rocking motion in any radial direction when the sleeves are in shifted position (FIGURE 6) in the same manner as above described for the sleeves 103 and 111 in FIGURE 4. One such sleeve is used with each pair of adjacent gears encircling said shaft, in the same manner as shown for the use of the sleeves 103 and 111 with the individual gears 74 and 77.

Although a particular embodiment of the invention has been disclosed above in detail for illustrative purposes, it will be recognized that variations or modifications of such disclosure, which lie within the scope of the appended claims, are fully contemplated.

What is claimed is:
1. A three-speed change gear unit, comprising:
  an input shaft having an input gear thereon, said input gear having clutch teeth thereon;
  a plurality of countershafts each having a first gear thereon in continuous mesh with said input gear, said first gears being substantially identical so that said countershafts are driven from said input gear at equal speeds;
  an intermediate shaft coaxial with and spaced axially from said input shaft, said intermediate shaft having external splines thereon;
  an intermediate gear surrounding said intermediate shaft and mounted for radial, but held against sub- stantial axial, movement with respect thereto, said intermediate drive gear having clutch teeth thereon;
substantially identical second gears secured to said countershafts and being in continuous meshing engagement with said intermediate gear so that said intermediate gear is supported by said second gears for radial movement with respect to said intermediate shaft;
a clutch sleeve splined on said intermediate shaft for axial movement therealong, said clutch sleeve having sets of clutch teeth which are selectably and alternatively engageable with said clutch teeth on said input gear and said intermediate gear whereby said intermediate shaft can be driven either directly from said input shaft or indirectly from said input shaft, said countershafts, said second gears and said intermediate gear;
a clutch part mounted on said intermediate shaft for rotation therewith at the end thereof opposite said input shaft, said clutch part having clutch teeth thereon;
an output shaft coaxial with and spaced axially from said intermediate shaft on the opposite side thereof from said input shaft, said output shaft having a splined portion adjacent the end thereof next to said intermediate shaft;
an output shaft gear surrounding said output shaft and mounted for radial movement, but held against substantial axial movement, with respect thereto, said output shaft gear having clutch teeth thereon;
substantially identical third gears secured to said countershafts and being in continuous meshing engagement with said output shaft gear so that said output shaft gear is supported by said third gears on said countershafts for radial movement with respect to said output shaft;
a second clutch sleeve splined on said splined portion of said output shaft for axial movement therealong, said second clutch sleeve having sets of clutch teeth which are selectably and alternatively engageable with the clutch teeth on said clutch part and on said output shaft gear;
whereby said output shaft can be driven either from said intermediate shaft or from said countershafts through said third gears and said output shaft gear.

2. A change-speed gear unit comprising:
an input shaft;
countershaft means driven from said input shaft and having a plurality of gears mounted in sets respectively thereon;
an intermediate shaft;
an intermediate gear adapted to be driven by one of said sets of said gears on said countershaft means, said intermediate gear being rotatable with respect to said intermediate shaft;
first clutching means for selectably and alternatively coupling said intermediate shaft to said input shaft and to said intermediate gear;
an output shaft;
an output shaft gear adapted to be driven by another of said sets of gears on said countershaft means, said output shaft drive gear being rotatable with respect to said output shaft; and
second clutching means for selectably and alternatively coupling said output shaft to said intermediate shaft and to said output shaft gear.

3. A change-speed gear unit according to claim 2, in which said input shaft, said intermediate shaft and said output shaft are coaxial with each other and are arranged in series; and
in which said countershaft means includes a plurality of countershafts arranged symmetrically with respect to and spaced radially from said input shaft, said intermediate shaft and said output shaft; said countershafts having a plurality of sets of substantially identical gears affixed thereto, said intermediate gear and said output shaft drive gear each being received between and supported by one of said sets of gears.

4. A change-speed gear unit according to claim 2, in which said intermediate gear and said output shaft gear are each continuously meshed with a countershaft gear continuously connected with said countershaft means whereby said intermediate gear and said output shaft drive gear are continuously driven in preselected speed ratios with respect to said input shaft.

5. A change-speed gear unit according to claim 4, including gear means for driving said countershaft means at a substantially slower speed than said input shaft and wherein said countershaft gear meshed with said output shaft gear drives same at a somewhat slower speed than the speed at which said intermediate gear is driven, said first clutching means including synchronizing means for synchronizing the speed of said intermediate shaft with either said input shaft or said intermediate gear depending on which one is to be coupled with said intermediate shaft, said second clutching means being unsynchronized.

6. A change-speed gear transmission, comprising:
a main unit having an input shaft, an output shaft and gearing providing a plurality of alternatively selectable speed ratios between said main unit input and output shafts;
an auxiliary unit comprising countershaft means continuously coupled to said main unit output shaft for being driven thereby, an intermediate shaft and an output shaft;
an intermediate gear continuously coupled with said countershaft means;
an auxiliary output shaft gear continuously coupled with countershaft means; and
clutching means for selectably and alternatively coupling (1) said main unit output shaft to said intermediate shaft and said intermediate shaft to said auxiliary output shaft, (2) said intermediate gear to said intermediate shaft and said intermediate shaft to said auxiliary output shaft, and (3) said auxiliary output shaft gear to said auxiliary output shaft.

7. A change-speed gear transmission according to claim 6, in which said main unit output shaft, said intermediate shaft and said auxiliary unit output shaft are coaxial with each other and arranged in series; and
in which said countershaft means includes a plurality of countershafts arranged symmetrically with respect to and spaced radially from said main unit output shaft, said intermediate shaft and said auxiliary unit output shaft;
said countershafts having a plurality of sets of substantially identical gears affixed thereto, said intermediate gear and said auxiliary output shaft gear each being received between and supported by one of said sets of gears.

8. In a range shift transmission having a main transmission and an auxiliary transmission serially connected to each other and having in said auxiliary transmission gear means providing a direct drive and a first reduction drive, the improvement comprising:
gear means providing a second reduction ratio in said auxiliary transmission;
an input shaft for driving said auxiliary transmission and an axially spaced output shaft for delivering power from said auxiliary transmission;
an intermediate shaft positioned axially between said input shaft and said output shaft;
first clutch means for alternatively clutching said direct drive means and said first reduction gear means to said intermediate shaft;

second clutch means for alternatively clutching said intermediate shaft and said second reduction gear means to said output shaft.

9. The transmission defined in claim 8 wherein the difference in ratios between said direct drive and said first reduction ratio is at least as great as the ratios between a selected group of gears in said main transmission and the difference between said first reduction ratio and said second reduction ratio is less than said first-mentioned ratio difference.

10. The transmission defined in claim 9 wherein said direct drive and first reduction ratio means are characterized by the presence of synchronizing means operably positioned therebetween and by interlock means preventing shifting of said first clutch means between direct drive and said first reduction ratio excepting when said main transmission is in neutral; and said second reduction gear means and said first reduction gear means being characterized by the absence of synchronizers therebetween and by freedom of said second clutch means to move at any time at the will of an operator.

References Cited by the Examiner
UNITED STATES PATENTS 3,105,395   10/1963   Perkins  —————— 74—745
3,237,472   3/1966   Perkins et al.  ———— 74—331

DAVID J. WILLIAMOWSKY, *Primary Examiner.*

H. S. LAYTON, *Assistant Examiner.*